United States Patent [19]
Palm

[11] Patent Number: 5,501,259
[45] Date of Patent: Mar. 26, 1996

[54] INFLATABLE RESTRAINT DEVICE AND METHOD OF MANUFACTURING SAME

[76] Inventor: Edward B. Palm, 1710 Shore Club Dr., St. Clair Shores, Mich. 48080

[21] Appl. No.: 236,964

[22] Filed: May 2, 1994

[51] Int. Cl.⁶ .......................... B60R 21/16; B29C 41/02
[52] U.S. Cl. .................. 156/156; 156/165; 280/743.1
[58] Field of Search .................. 280/743 R, 728 R; 156/156, 160, 165, 229, 308.2, 309.6

[56] References Cited

U.S. PATENT DOCUMENTS

| | | | |
|---|---|---|---|
| 2,360,925 | 10/1944 | Wyman | 156/165 |
| 3,282,757 | 11/1966 | Brussee | 156/165 |
| 3,623,928 | 11/1971 | Winckinofer | 156/156 |
| 3,807,754 | 4/1974 | Rodenbach et al. | |
| 4,144,632 | 3/1979 | Stroupe | 156/165 |
| 4,285,998 | 8/1981 | Thibodeau | |
| 4,499,242 | 2/1985 | Mahr | |
| 4,963,412 | 10/1990 | Kokeguchi | |
| 5,001,003 | 3/1991 | Mahr | |
| 5,032,200 | 7/1991 | DiBartola et al. | 156/156 |
| 5,044,663 | 9/1991 | Seizert | 280/743 R |
| 5,046,759 | 9/1991 | Enniss et al. | 280/743 R |
| 5,077,110 | 12/1991 | Medwin | |
| 5,097,784 | 3/1992 | Baudet | |
| 5,131,434 | 7/1992 | Krummheuer et al. | |
| 5,161,479 | 11/1992 | Mahr | |
| 5,178,408 | 1/1993 | Barrenscheen et al. | |
| 5,193,847 | 3/1993 | Nakayama | |
| 5,213,363 | 5/1993 | Fukumori et al. | |
| 5,215,795 | 6/1993 | Matsumoto et al. | |

FOREIGN PATENT DOCUMENTS

| | | | |
|---|---|---|---|
| 0485603A1 | 5/1990 | European Pat. Off. | |
| 0486697A1 | 6/1991 | European Pat. Off. | |
| 1-317847 | 12/1989 | Japan | 280/743.1 |
| 3-97949 | 4/1991 | Japan | 280/743 R |
| 3-227751 | 10/1991 | Japan | 280/743 R |
| 3-276845 | 12/1991 | Japan | 280/743 R |
| 3-271041 | 12/1991 | Japan | 280/743 R |
| 3-273958 | 12/1991 | Japan | 280/743 R |
| 4-24143 | 1/1992 | Japan | 280/743 R |
| 4-19251 | 1/1992 | Japan | 280/743 R |
| 4-2539 | 1/1992 | Japan | 280/743 R |
| 4-15143 | 1/1992 | Japan | 280/743 R |
| 4-46840 | 2/1992 | Japan | 280/743 R |
| 4-100753 | 4/1992 | Japan | 280/743.1 |

*Primary Examiner*—Karin L. Tyson
*Attorney, Agent, or Firm*—Harness, Dickey & Pierce

[57] ABSTRACT

A one piece laminated air bag has an inner layer of sheet material, a middle layer of load carrying fibers and an outer layer of sheet material. The load carrying fibers are laid in a pre-specified pattern such that a majority of loads in the air bag are carried by the fibers. The method of manufacturing the air bag includes an inflatable mold which is inflated to the required configuration, covered with the various layers and deflated after the laminating of sheets to form the one piece laminated air bag.

13 Claims, 3 Drawing Sheets

INFLATABLE RESTRAINT DEVICE AND METHOD OF MANUFACTURING SAME

FIELD OF THE INVENTION

The present invention relates to a shock absorbing air bag. More particularly, the present invention relates to a single piece seamless air bag and a method of manufacturing the air bag.

BACKGROUND OF THE INVENTION

Air bag systems for protecting passengers to prevent injury to the human body during automobile collisions have been developed as far back as the mid 1960's. By the early 1970's, enough testing had been completed to prove the feasibility of the air bag and the current process and design standards were adopted. Air bag systems are now standard equipment in most of the new vehicles on sale today.

The air bag system comprises a sensor or a plurality of sensors for detecting a collision of the vehicle, a gas generator or inflator for expanding the air bag in response to a signal from a sensor, and an air bag expanded by the gas generator for absorbing any shock imposed on the passenger during the collision.

The air bag has a hollow portion for receiving the gas, an opening for attachment of the gas generator, and a mechanism for venting of the gas from the air bag after expansion to provide the collapse of the air bag and the cushioning of the passenger. Various designs of venting mechanisms have been developed which include a vent hole and/or the use of the permeability of the fabric of the air bag. In order to partially or fully restrict the permeability of the fabric of the air bag and for the reinforcements of the stitched portions of the seams of the air bag, a coating may be provided on the fabric of the air bag.

The prior art manufacture of air bags normally involves initially preparing a woven fabric utilizing a high strength synthetic fiber; cutting two or more pieces of this woven fabric into specific shapes; binding, sewing or gluing the peripheral edges of the various pieces of woven fabric together; and subsequently providing the opening for attaching the gas generator and providing for the gas ventilating mechanism. Once manufactured, these bags are assembled to the gas generator, packaged and shipped to the automotive assembly plants for assembly into the finished vehicle.

While the above prior art process has undergone numerous refinements over the past 20 years, the concept has remained basically unchanged. The above prior art process is an expensive labor intensive process using expensive materials with little opportunity for significant cost reductions. The air bag which is produced is a somewhat heavy bag which is stiff and therefore difficult to fold and compress into a small package to facilitate the assembly of the air bag into the vehicle. In addition, the multi-piece fabric which is used in the manufacturing of these prior art air bags produces an air bag which includes seams which are susceptible to gas leakage and, the fabric itself presents somewhat of an unfriendly abrasive surface to the passenger of the vehicle when it is inflated.

Accordingly, what is needed is a design and method of manufacturing an air bag which lends itself to automated production using relatively low cost materials. Ideally, the new design of air bag and its associated method of production will produce an air bag which is lighter weight, seamless and significantly lower in cost than the current design level of air bags. The new air bag will be lighter is weight, easier to compress and able to solve the other problems associated with the prior art air bags.

SUMMARY OF THE INVENTION

The present invention provides the art with a unique light weight, single piece, seamless air bag which is manufactured by a unique process of combining various relatively low cost materials in layers to produce a multi-layered air bag. The air bag of the present invention is a light weight, impermeable bag which is environmentally friendly while being unaffected by temperature or chemicals. The air bag is stronger than prior art air bags, able to be compressed into smaller packages for packaging in the vehicles and because it is seamless it does not have the problems associated with the seams of the prior art air bags. The layering of the material to protect the air bag of the present invention produces an air bag which is more friendly to the passenger when it is inflated, has a consistent wall thickness throughout the bag and a consistency of structure from bag to bag. The unique manufacturing process can be totally automated to significantly reduce the labor costs. The significant lowering of manufacturing costs in conjunction with the lower cost materials which are being layered, produces an air bag which exceeds the performance characteristics of prior art air bags while significantly lowering the costs associated with the air bag.

Other advantages and objects of the present invention will become apparent to those skilled in the art from the subsequent detailed description, appended claims and drawings.

BRIEF DESCRIPTION OF THE DRAWINGS

In the drawings which illustrate the best mode presently contemplated for carrying out the present invention.

DETAIL DESCRIPTION OF THE PREFERRED EMBODIMENT

Figure 1:
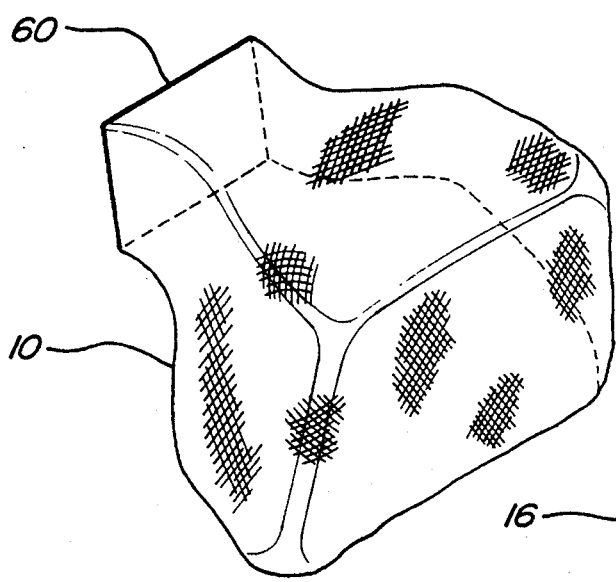
FIG. 1 is a perspective view of an inflated air bag in accordance with the present invention.
Figure 2:
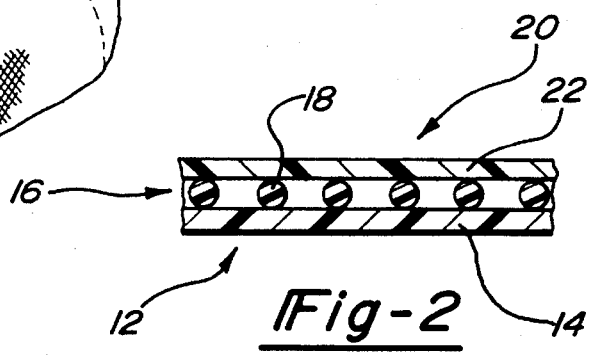
FIG. 2 is a sectional view of the air bag shown in FIG. 1 showing the layered construction of the air bag.

Referring now to the drawings in which like reference numerals designate like or corresponding parts throughout the several views, there is shown in FIG. 1 an inflated air bag according to the present invention which is designated generally by the reference numeral 10. Air bag 10 is a single piece, seamless, multiple ply air bag manufactured by a unique process as will be discussed later herein.

An inner or first ply 12 is comprised of a layer of film 14 such as Mylar, polyurethane or other material. The middle or second ply 16 is comprised of a plurality of synthetic fibers 18 such as Nylon, Polyester, Dacron or Kevlar, which laid over inner ply 12 in a multi-direction, pre-specified pattern which is developed using a finite element analysis of the stress characteristics required for the special shape of air bag 10. An outer or third ply 20 is also a layer of film 22 such as Mylar, polyurethane or other film material which is positioned over the top of synthetic fibers 18. In order to maintain the integrity of the multi-layer configuration of air bag 10, the combination of first ply 12, second ply 16 and third ply 18 are thermally sealed into a one piece structure.

While air bag 10 has been shown as a generally rectangular shaped air bag, it is to be understood that the air bag of the present invention can be configured to any required shape and the manufacturing process described below is capable of manufacturing the required configurations of the air bag of the present invention.

Figure 3:
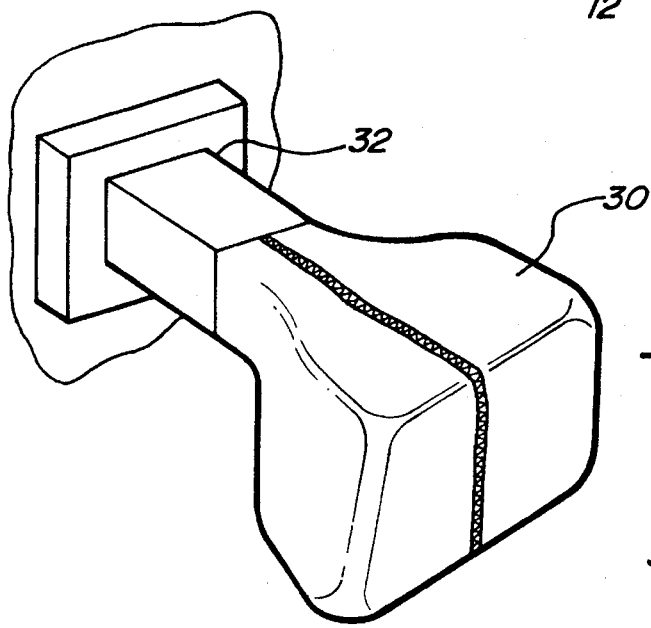
FIG. 3 is a perspective view of the inflatable mold for manufacturing the air bag shown in FIG. 1 shown in the inflated condition.
Figure 9:
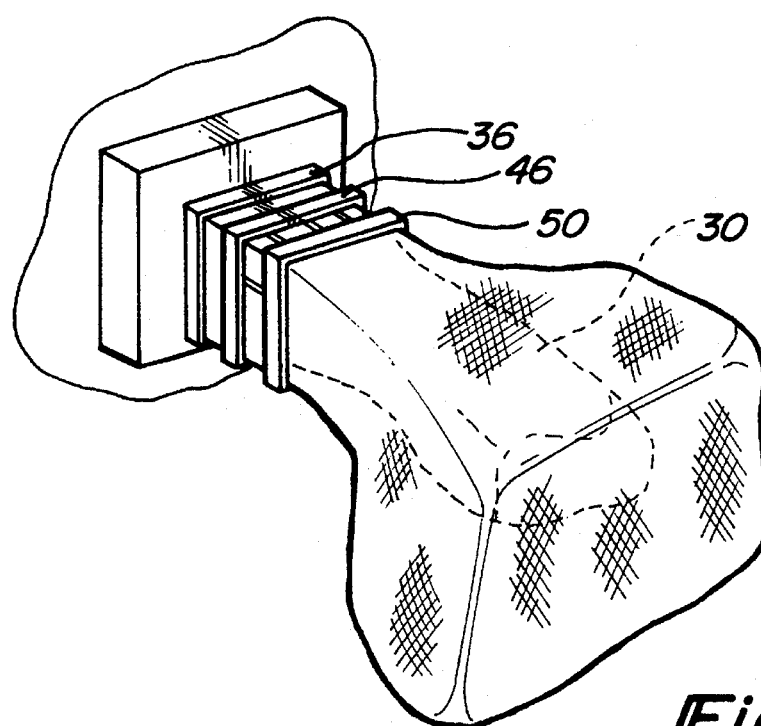
FIG. 9 is a perspective view of the completed air bag after deflation and prior to removal of the inflatable mold shown in FIG. 3.

FIGS. 3 and 9 illustrate the various steps required in manufacturing air bag 10 in accordance with the present invention. FIG. 3 illustrates a mold or bladder 30 which is shaped identical to the shape of air bag 10 being manufactured. Mold 30 is made from a flexible, smooth surface finish material that is impermeable and can be inflated and subsequently deflated millions of times without loosing either its shape or its strength. FIG. 3 illustrates mold 30 in its inflated condition. A compressed gas, normally air, has been pumped into an inlet 32 which has caused mold 30 to inflate into the condition shown in FIG. 3. After inflation into the specified shape, mold 30 is sprayed or covered with a mold release agent (not shown) which facilitates the removal of air bag 10 upon deflation of mold 30 as will be described later herein.

Figure 4:
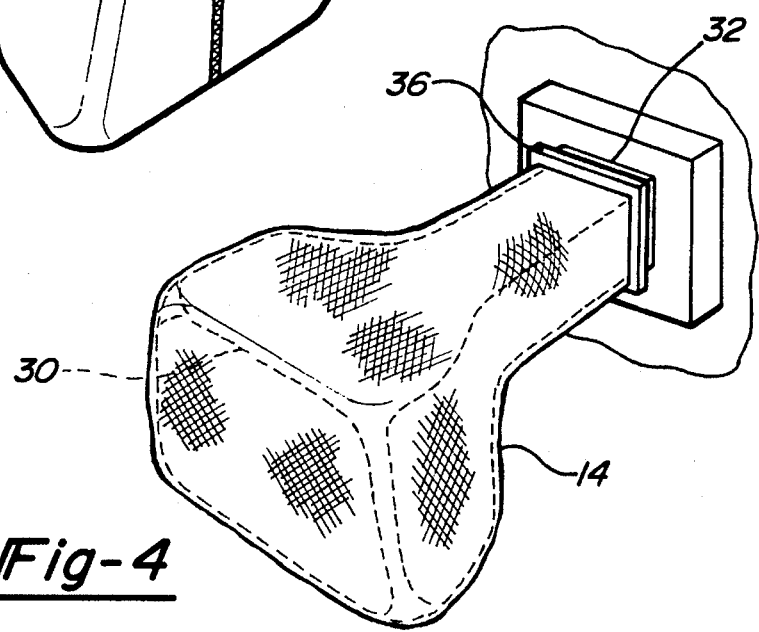
FIG. 4 is a perspective view of the first layer of film material after it has been placed over the inflatable mold shown in FIG. 3.

FIG. 4 illustrates the application of first ply 12 of film 14 which is placed over mold 30 after the mold release agent has been applied. Film 14 can be manufactured from Mylar, polyurethane or any other suitable film. Film 14 is laid such that it completely covers or surrounds mold 30. Film 14 may be held in place by a clamp 36 located near inlet 32 of mold 30, if desired.

Figure 5:
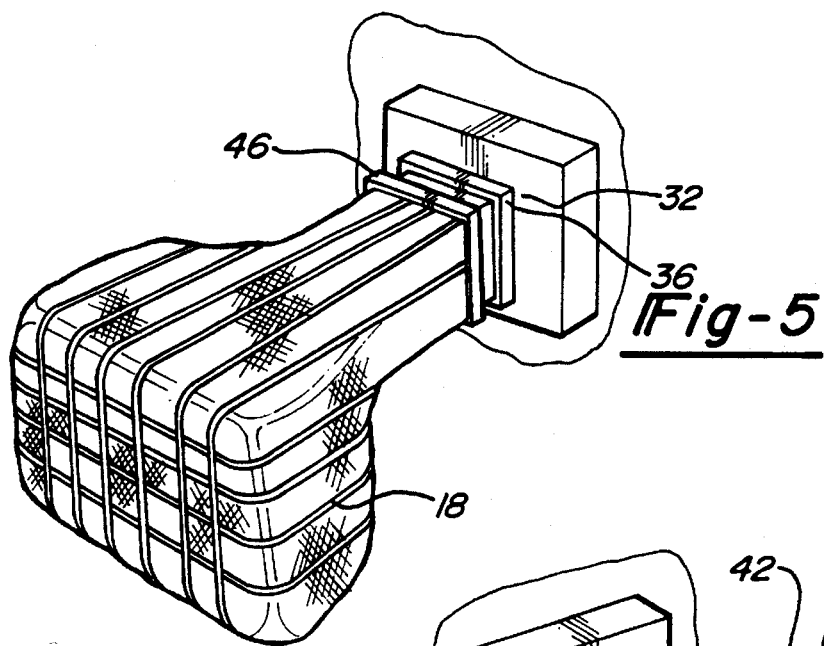
FIG. 5 is a perspective view of the synthetic fiber after it has been laid in a multi-direction pattern over the first film layer shown in FIG. 4.

FIG. 5 illustrates the application of ply 16 by the laying of the plurality of synthetic fibers 18 over film 14 according to a pre-specified pattern. The pre-specified pattern for the laying of the plurality of fibers 18 is determined by using a computer running a finite element analysis program which models the shape of air bag 10 and provide the areas of high and low stresses to indicate the required pattern for the laying of the plurality of synthetic fibers 18 in order to reinforce air bag 10 in the higher stress areas. Performing the finite element analysis for the specified shape of air bag 10 in order to determine the pattern required for the plurality of synthetic fibers 18 is well known in the art and will not be discussed further herein.

Figure 6:
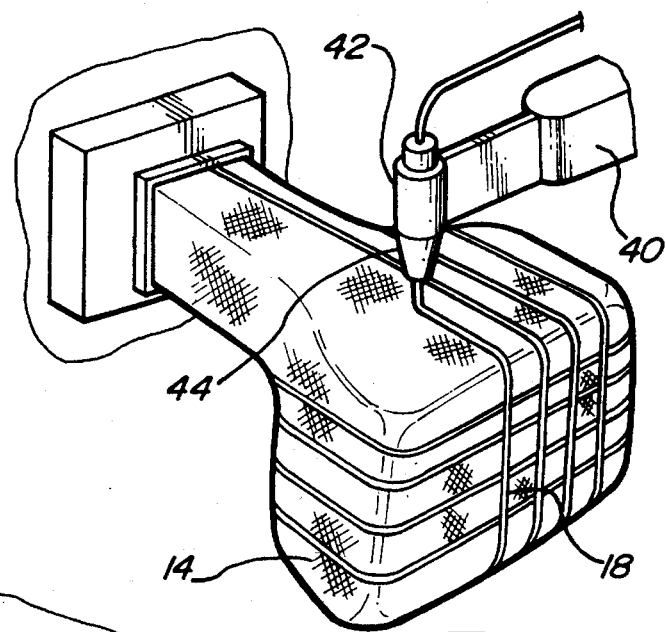
FIG. 6 is a perspective view showing a robot incorporating a typical thread applicator head which can be utilized for laying the synthetic fiber shown in FIG. 5.

The laying of the plurality of synthetic fibers 18 can be accomplished using a multi-axis fiber laying robot 40 which is capable of being programmed for movement in each of the three axes. Robot 40 preferably applies fibers 18 under uniform tension to minimize distortions in the completed air bag. One suitable method for applying fibers 18 is to apply a hot melt or other adhesive to the fiber prior to application. Robot 40, as shown in FIG. 6, includes a thread applicator 42 which may include a heating element 44 to heat or melt the adhesive on the fiber immediately prior to application to the film. Once fibers 18 have been laid in the pre-specified pattern, they may be clamped in position by a clamp 46 located at inlet 32 as shown in FIG. 5.

Upon completion of the fiber application step, additional adhesive may be applied over the entire surface, such as by a spraying or a roller application. In the alternative, the inner facing surfaces of either or both films 14 and 22 may be uniformly precoated with a dry, thermally actuated adhesive.

Figure 7:
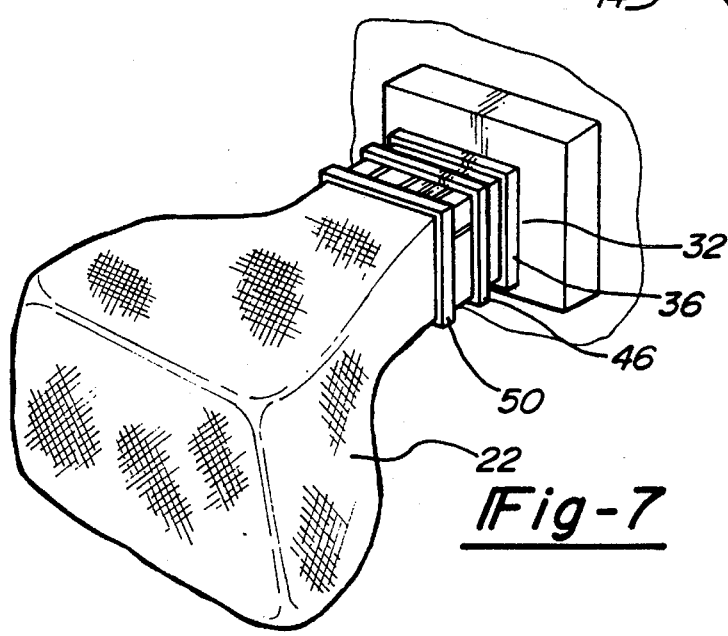
FIG. 7 is a perspective view of the final layer of film material after it has been placed over the synthetic fibers shown in FIG. 5.

FIG. 7 illustrates the laying or stretching of the final ply 20 of film 22 over mold 30, first ply 12 and second ply 16. Similar to film 14, film 22 can be manufactured from Mylar, polyurethane or any other suitable film. Film 22 is laid such that it completely covers or surrounds mold 30. Film 22 can be held in place by a clamp 50 located near inlet 32 of mold 30 if desired.

Figure 8:
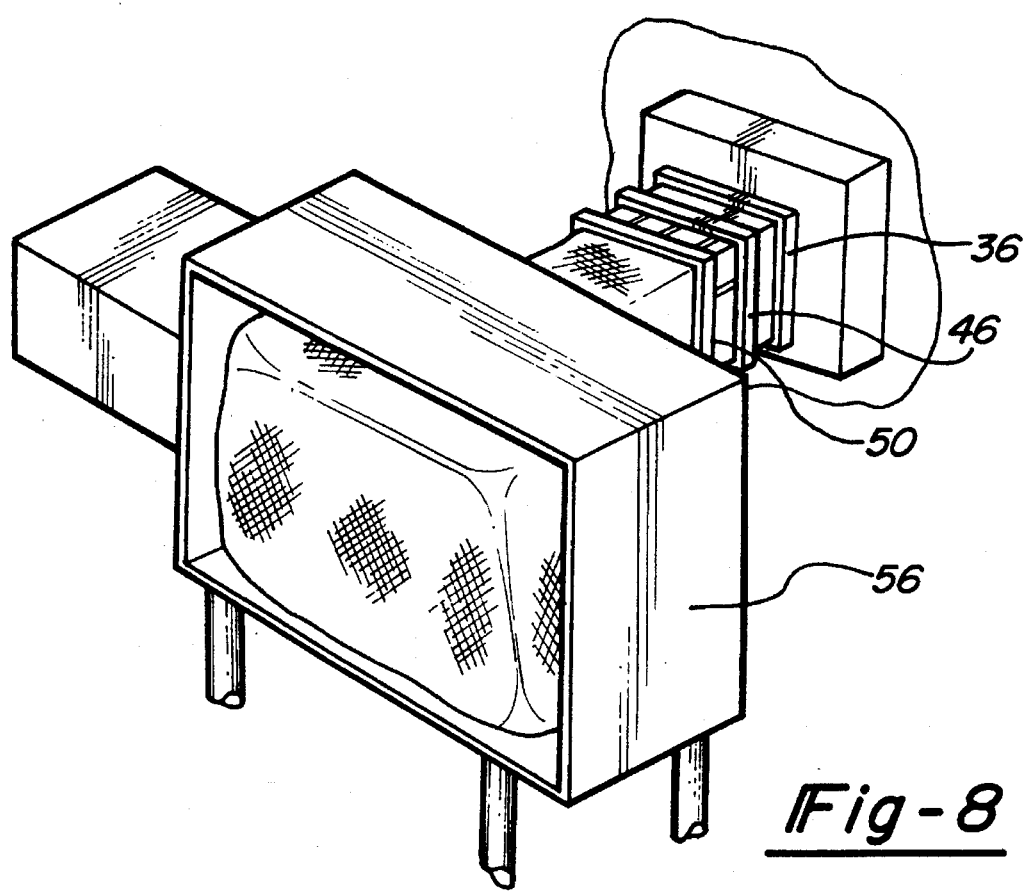
FIG. 8 is a perspective view showing the application of heat to thermally seal the multi-layer air bag shown in FIG. 7.

The lamination of air bag 10 is completed by completely curing the adhesive using heat or light and/or pressure, depending on the adhesive and materials employed. FIG. 8 illustrates the application of heat to cure the adhesive and thermally seal multi-ply air bag 10 using a plurality of heaters 56.

After the adhesive has cured or set, clamps 36, 46 and 50 can be removed. Mold 30 can be deflated and removed from the interior of air bag 30 and any finishing operations can be completed such as forming an inlet 60 in air bag 10 and/or at least one vent hole (not shown) if required by the specified design of air bag.

The above detailed manufacturing process thus produces a single piece, seamless air bag having a specified shape and strength. The air bag is lighter, impermeable and environmentally friendly such that it is unaffected by temperature or chemicals. The air bag is stronger than prior art air bags, it is able to be compressed into smaller packages and the seamless feature eliminates the problems associated with leaking at the seams of prior art air bags. The manufactured air bag will have a consistent wall thickness in each air bag as well as from air bag to air bag and the air bag will present a more friendly surface to the user as opposed to the abrasive nature of the prior art fabric constructions. Finally, the manufacturing process detailed above can be totally automated and thus dramatically reduce both the material costs and labor costs associated with manufacturing of air bags.

While the above detailed description describes the preferred embodiment of the present invention, it is to be understood that the present invention is susceptible to modification, variation and alteration without deviating from the scope and fair meaning of the subjoined claims.

What is claimed is:

1. A method of manufacturing an air bag having a mouth, said method comprising the steps of:

inflating a mold to a pre-specified configuration;

locating a first sheet over said mold so as to form a cavity having a single opening at said mouth of said air bag;

applying a plurality of fibers on said first sheet according to a pre-specified pattern;

locating a second sheet over said mold so as to form said cavity having said single opening at said mouth of said air bag;

laminating said first and second sheets together; and separating said air bag from said mold.

2. The method according to claim 1 further comprising the step of applying adhesive between said first and second sheets prior to laminating said sheets together.

3. The method according to claim 1 wherein said plurality of fibers are applied to said first sheet under substantially uniform tension.

4. The method according to claim 1 wherein said fibers are coated with adhesive prior to application to said first sheet.

5. The method according to claim 1 wherein said pre-specified pattern for said plurality of yarns is determined using finite element analysis prior to applying said plurality of fibers according to said pre-specified pattern.

6. The method according to claim 1 wherein the step of separating said air bag from said mold comprises:

deflating said mold; and removing said mold from said cavity through said single opening of said air bag.

7. The method according to claim 1 wherein said laminating step includes applying heat to said second sheet.

8. The method according to claim 7 further comprising the step of applying adhesive between said first and second sheets prior to applying heat to said second sheet.

9. The method according to claim 7 wherein said fibers are coated with adhesive prior to application to said first sheet.

10. The method according to claim 1 wherein the step of applying said plurality of fibers applies said fibers in a continuous uninterrupted fashion.

11. The method according to claim 1 further comprising the step of clamping said first sheet to said mold.

12. The method according to claim 1 further comprising the step of clamping said plurality of fibers to said mold.

13. The method according to claim 1 further comprising the step of clamping said second sheet to said mold.

* * * * *